(12) United States Patent
Son et al.

(10) Patent No.: US 10,193,489 B2
(45) Date of Patent: Jan. 29, 2019

(54) METHOD AND APPARATUS FOR ACOUSTIC SIGNAL GENERATION

(71) Applicant: GM GLOBAL TECHNOLOGY OPERATIONS LLC, Detroit, MI (US)

(72) Inventors: Yo Chan Son, Rochester Hills, MI (US); Si-hyung Lee, Rochester, MI (US); Aayush Gupta, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/618,573

(22) Filed: Jun. 9, 2017

(65) Prior Publication Data

US 2018/0358916 A1    Dec. 13, 2018

(51) Int. Cl.
  *H02P 27/08* (2006.01)
  *H02M 7/5395* (2006.01)
  *H02M 1/08* (2006.01)
  *G10K 9/12* (2006.01)

(52) U.S. Cl.
  CPC ............... *H02P 27/08* (2013.01); *G10K 9/12* (2013.01); *H02M 1/08* (2013.01); *H02M 7/5395* (2013.01)

(58) Field of Classification Search
  CPC ............ H02P 27/08; G10K 9/12; H02M 1/08
  See application file for complete search history.

(56) References Cited

U.S. PATENT DOCUMENTS

| 8,212,505 B2 | 7/2012 | Nagashima et al. |
| 9,271,073 B2 | 2/2016 | Valeri et al. |
| 2010/0134058 A1* | 6/2010 | Nagashima ............ B60L 11/14 318/400.23 |
| 2011/0290573 A1* | 12/2011 | Hanada ................. B60K 6/445 180/65.285 |
| 2017/0130625 A1* | 5/2017 | Jung ........................ F01N 9/00 |

FOREIGN PATENT DOCUMENTS

| DE | 102010049359 A1 | 5/2011 |
| DE | 102010043973 A1 | 5/2012 |
| DE | 102014017570 A1 | 6/2016 |

OTHER PUBLICATIONS

Jonas Muhlethaler, Manuel Schubiger, Uwe Badstubner, Johann W. Kolar, "Acoustic Noise in Inductive Power Components", ABB Switzerland, Ltd., Power Electronic Systems Laboratory, published in Switzerland, 8 pages.

* cited by examiner

*Primary Examiner* — Muhammad S Islam
(74) *Attorney, Agent, or Firm* — Quinn IP Law

(57) ABSTRACT

A motor drive system for controlling operation of an electric machine is described. An inverter includes paired power transistors that are electrically connected to the electric machine, wherein the inverter is electrically connected to a DC power source via a high-voltage electrical power bus. A motor controller includes a first controller and an acoustic signal generator, wherein the first controller is disposed to control the paired power transistors of the inverter. The first controller determines an initial output voltage based upon a torque command and the acoustic signal generator is disposed to generate a sound injection voltage. The motor controller combines the initial output voltage and the sound injection voltage. The motor controller generates PWM commands to control the paired power transistors of the inverter, wherein the PWM commands are determined based upon the initial output voltage and the sound injection voltage.

15 Claims, 3 Drawing Sheets

METHOD AND APPARATUS FOR ACOUSTIC SIGNAL GENERATION

INTRODUCTION

Electric machines can be employed as torque machines on vehicles and other mobile devices generate audible acoustic sound that may not be readily perceptible under certain circumstances.

SUMMARY

A motor drive system for controlling operation of a multi-phase electric machine is described. The motor drive system includes an inverter and a motor controller. The inverter includes a plurality of paired power transistors that are electrically connected to the electric machine, wherein the inverter is electrically connected to a DC power source via a high-voltage electrical power bus. The motor controller includes a first controller and an acoustic signal generator, wherein the first controller is disposed to control the paired power transistors of the inverter to effect operation of the multi-phase electric machine. The first controller is disposed to determine an initial output voltage based upon a torque command and the acoustic signal generator is disposed to generate a sound injection voltage. The motor controller is disposed to combine the initial output voltage and the sound injection voltage. The motor controller is disposed to generate pulsewidth-modulated (PWM) commands to control the paired power transistors of the inverter, wherein the PWM commands are determined based upon the initial output voltage and the sound injection voltage.

An aspect of the disclosure includes the motor controller being disposed to generate the commands to control the paired power transistors of the inverter in response to the torque command and based upon the sound injection voltage.

Another aspect of the disclosure includes the acoustic signal generator disposed to generate the sound injection voltage including a sound pattern generator that is disposed to generate an instantaneous audio signal and a rotational transformation element that is disposed to generate the sound injection voltage based upon the instantaneous audio signal.

Another aspect of the disclosure includes the motor controller being disposed to generate the commands to control the paired power transistors of the inverter in response to the torque command, a rotational speed of the electric machine, and a voltage level of the high-voltage electrical power bus and based upon the sound injection voltage.

Another aspect of the disclosure includes the acoustic signal generator including a sound pattern generator, wherein the acoustic signal generator is disposed to generate the sound injection voltage based upon an output from the sound pattern generator.

Another aspect of the disclosure includes the sound pattern generator being an arbitrary sound generator look-up table including frequency components that are greater than a current regulation bandwidth that is associated with the first controller.

Another aspect of the disclosure includes the first controller including a current regulator disposed to generate current commands responsive to the torque command, wherein the acoustic signal generator includes a sound pattern generator that includes an arbitrary sound generator look-up table having frequency components that are greater than a current regulation bandwidth that is associated with the current regulator.

Another aspect of the disclosure includes the first controller including a first converter and a current regulator, wherein the first controller generates current commands in response to a torque command, the current regulator generates initial output voltage commands based upon the current commands, the acoustic signal generator includes an acoustic sound pattern generator, the acoustic signal generator being disposed to generate the sound injection voltage based upon an output from the acoustic sound pattern generator, and the sound injection voltage being combined with the initial output voltage commands. The sound injection voltage combined with the initial output voltage commands is communicated to the first controller to generate PWM commands to control the paired power transistors of the inverter.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material has not been described in detail in order to avoid obscuring the disclosure. Furthermore, the drawings are in simplified form and are not to precise scale. Furthermore, the disclosure, as illustrated and described herein, may be practiced in the absence of an element that is not specifically disclosed herein. Furthermore, like numerals refer to like elements throughout the drawings.

Figure 1:
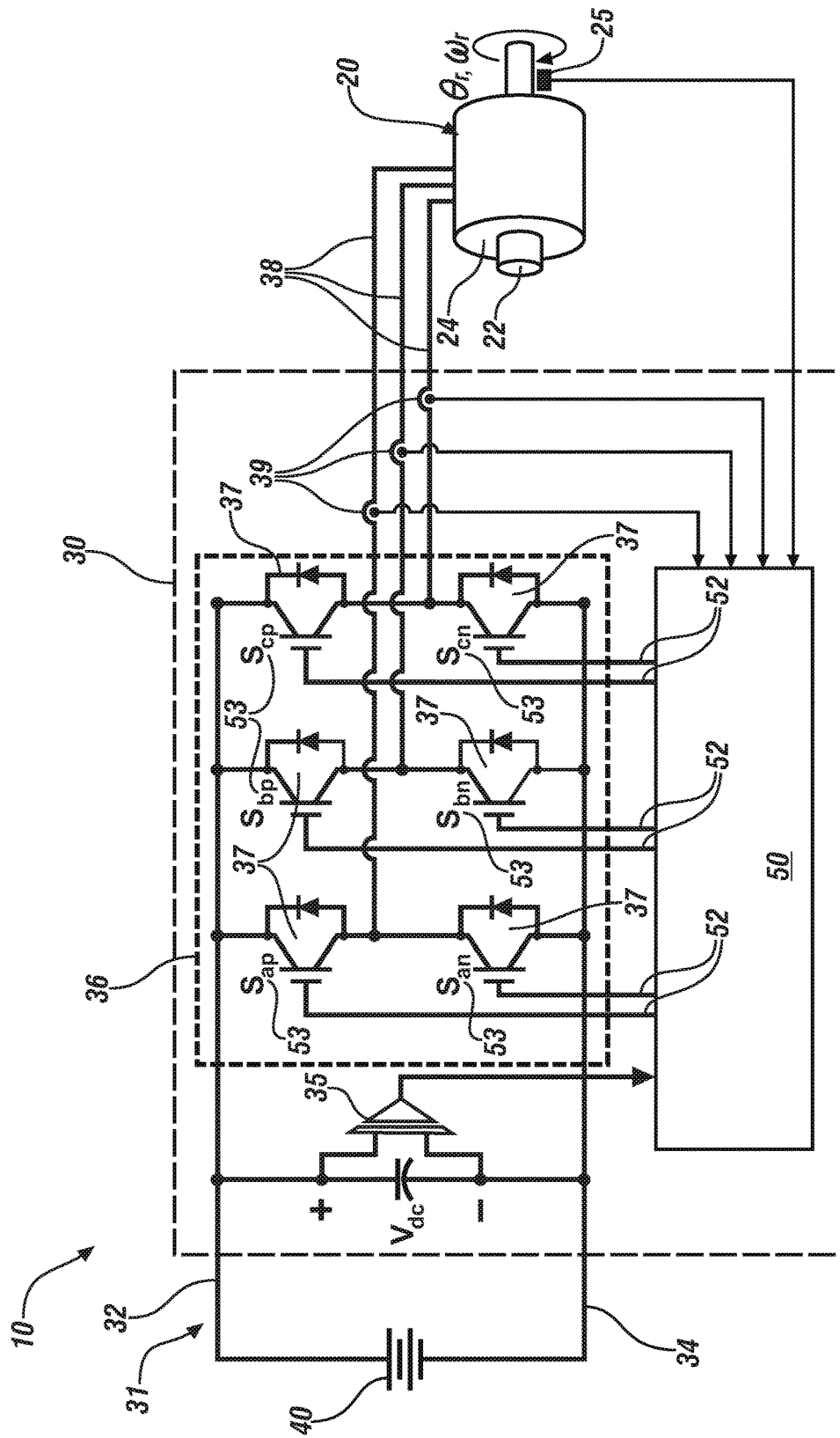
FIG. 1 schematically shows a multi-phase electric motor drive system that includes an inverter module that is disposed between a DC power source and a multi-phase electric motor/generator, in accordance with the disclosure.

Referring now to the drawings, which are provided for the purpose of illustrating certain exemplary embodiments and not for the purpose of limiting the same, FIG. 1 schematically illustrates a multi-phase electric motor drive system 10 that includes an inverter module 30 that is disposed between a DC power source 40 and a multi-phase electric motor/generator (electric machine) 20. The inverter module 30 includes a motor controller 50 and an inverter power circuit 36, which can be collocated in a single package. In one non-limiting embodiment, the multi-phase electric motor drive system 10 may be disposed on a vehicle to provide torque for tractive effort. In such embodiments, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The electric machine 20 may be a suitable electric machine, and can be configured as a three-phase permanent magnet device that includes a rotor 22 that is disposed within a stator 24, wherein rotational position $\theta_r$ and rotational speed $\omega_r$ of the rotor 22 can be monitored by a position sensor 25. In one embodiment, the position sensor 25 is a Hall effect sensor. Alternatively or in addition, the electric machine 20 may include a resolver (not shown) that can be disposed to monitor the rotor position $\theta_r$ and speed $\omega_r$.

The DC power source 40 is electrically connected to the inverter power circuit 36 via a high-voltage bus 31, which preferably includes a positive high-voltage bus link (HV+) 32 and a negative high-voltage bus link (HV−) 34. A voltage sensor 35 is disposed to monitor electric potential across HV+ 32 and HV− 34. In one embodiment, the DC power source 40 may electrically connect via an on-vehicle battery charger to a remote, off-vehicle electric power source for charging when in a stationary position.

The DC power source 40 electrically connects to the inverter power circuit 36 via the high-voltage DC bus 31 to transfer high-voltage DC electric power via a plurality of power conductors 38 to the electric machine 20 in response to control signals originating in the motor controller 50. The inverter power circuit 36 includes suitable control circuits including a plurality of paired power transistors 37, e.g., Integrated Gate Bipolar Transistors (IGBTs) for transforming high-voltage DC electric power to high-voltage AC electric power and transforming high-voltage AC electric power to high-voltage DC electric power. The power transistors 37 of the inverter 30 are electrically connected to the electric machine 20 via the power conductors 38, and current sensors 39 are disposed to monitor electrical current in each of the power conductors. In one non-limiting embodiment, the inverter power circuit 36 and motor controller 50 are configured as a three-phase voltage-source pulsewidth-modulated converter that can operate in either a linear mode or a non-linear mode.

The motor controller 50 can control the power transistors 37 of the inverter power circuit 36 to convert stored DC electric power originating in the DC power source 40 to AC electric power to drive the electric machine 20 to generate torque. Similarly, the motor controller 50 can control the power transistors 37 of the inverter power circuit 36 to convert mechanical power transferred to the electric machine 20 to DC electric power to generate electric energy that is storable in the DC power source 20, including as part of a regenerative control strategy. The motor controller 50 can control the power transistors 37 employing linear and/or non-linear pulsewidth-modulating (PWM) control strategies. The motor controller 50 receives motor control commands and controls inverter states of the inverter power circuit 36 to provide motor drive and regenerative power functionalities. Signal inputs from the position sensor 25, the power conductors 38 and the voltage sensor 35 are monitored by the motor controller 50. The motor controller 50 communicates via control lines 52 to individual ones of the power transistors 37 of the inverter power circuit 36. The motor controller 50 includes control circuits, algorithms and other control elements to generate transistor control inputs $S_{ap}$~$S_{cn}$ 53 which are communicated via the control lines 52 to the power transistors 37 of the inverter power circuit 36. The power transistors 37 control the output currents $i_a$, $i_b$ and $i_c$, which are transferred via the power conductors 38 to the electric machine 20 to generate power in the form of torque and/or rotational speed based upon the motor position $\theta_r$ and speed $\omega_r$.

Figure 2:
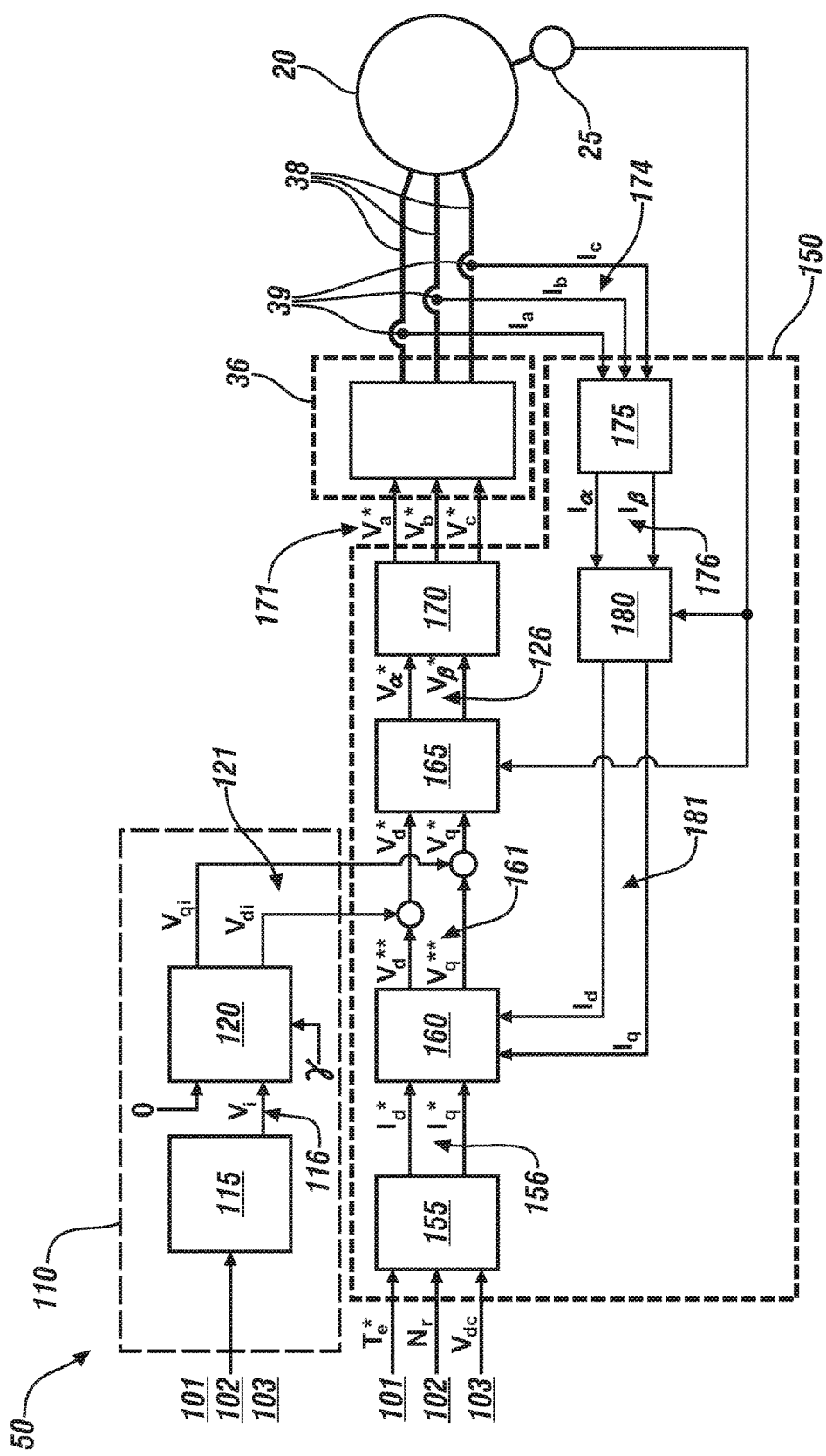
FIG. 2 schematically shows a block diagram of an embodiment of the motor controller and inverter circuit that are disposed to control operation of the electric machine described with reference to FIG. 1, in accordance with the disclosure.

FIG. 2 schematically shows an embodiment of the motor controller 50 and inverter power circuit 36, which are disposed to control operation of the electric machine 20. The motor controller 50 includes a first controller 150 and an acoustic signal generator 110, which combine to generate input signals $V_a$, $V_b$ and $V_c$ that are converted to the transistor control inputs $S_{ap}$~$S_{cn}$ 53 to control the power transistors 37 of the inverter power circuit 36. The first controller 150 generates commands to control operation of the electric machine 20 based upon operating conditions and inputs including a torque command 101, motor speed 102 and electrical potential, i.e., bus voltage 103 across the high-voltage bus 31. The acoustic signal generator 110 generates a control output that injects an acoustic sound element in the form of a sound injection voltage 121 into the first controller 150. The acoustic signal generator 110 can be in the form of a dedicated hardware circuit, an algorithm or another suitable form. The sound injection voltages 121 from the acoustic signal generator 110 and the initial output voltages $V_d^{}$ and $V_q^{}$ 161 combine to form voltage signals for controlling the motor output voltage that controls the electric machine 20 to generate a suitable acoustic signal coincident with generating and controlling torque and/or speed. As employed herein, the term 'sound' refers to audible acoustic sound.

The first controller 150 is composed of a torque-to-current converter 155, a current regulator 160, an inverse Park transformation operation $T^{-1}(\theta)$ (dq-$\alpha\beta$) 165, an inverse Clarke transformation ($\alpha\beta$-abc) operation 170, a Clarke transformation operation (abc-$\alpha\beta$) 175, and a Park transformation operation $T(\theta)$ ($\alpha\beta$-dq) 180.

The torque-to-current converter 155 converts the torque command 101 into a pair of current commands $i_d^*$ and $i_q^*$ 156, which are input to the current regulator 160. Monitored 3-phase AC currents from the power conductors 38, i.e., $i_a$, $i_b$ and $i_c$ 174 are reduced to stationary reference frame currents in the form of a pair of sinusoidal currents $i_\alpha$ and $i_\beta$ 176 by the Clarke transformation operation (abc-$\alpha\beta$) 175, and then transformed into currents $i_d$ and $i_q$ 181 by the Park transformation operation $T(\theta)$ ($\alpha\beta$-dq) 180 in the rotating reference domain using the motor position and motor speed information from the position sensor 25. The current regulator 160 uses the pair of current commands $i_d^*$ and $i_q^*$ 156 from the torque-to-current converter 155 and feedback from the Park transformation operation $T(\theta)$ ($\alpha\beta$-dq) 180 to generate a pair of initial output voltages $V_d^{}$ and $V_q^{}$ 161 for operating the electric machine 20 to generate torque.

The acoustic signal generator 110 is composed of a sound pattern generator 115 that generates an instantaneous audio signal $V_i$ 116, and a rotational transformation element 120 that generates sound injection voltages $V_{di}$ and $V_{qi}$ 121 based upon the instantaneous audio signal $V_i$ 116. The term 'generator' as employed in the terms 'acoustic signal generator' and 'sound pattern generator' can include hardware, software, and/or firmware components that have been configured to perform the associated specified functions that have been described. The sound injection voltages $V_{di}$ and $V_{qi}$ 121 are injected to the initial output voltages $V_d^{}$ and $V_q^{}$ 161 for operating the electric machine 20 to generate torque. The instantaneous audio signal $V_i$ 116 from the sound pattern generator 115 is generated and decomposed by the rotational transformation element 120 so as to vary the sound injection. The rotational transformation 120 is executed to locate the sound injection voltages $V_{di}$ and $V_{qi}$ 121 into the correct angular location γ in the electromagnetic circuit of the electric machine 20, and can be expressed as follows.

$$\begin{bmatrix} V_{di} \\ V_{qi} \end{bmatrix} = \begin{bmatrix} \cos\gamma & -\sin\gamma \\ \sin\gamma & \cos\gamma \end{bmatrix} \begin{bmatrix} 0 \\ V_i \end{bmatrix} = \begin{bmatrix} -V_i \sin\gamma \\ V_i \cos\gamma \end{bmatrix} \quad [1]$$

wherein γ represents the correct angular location.

The sound injection voltages $V_{di}$ and $V_{qi}$ 121 are added to the initial output voltages $V_d^{}$ and $V_q^{}$ 161 that are output from the current regulator 160 to generate the signal that is input to the inverse rotational transformation operation $T^{-1}(\theta)$ (dq-αβ) 165, i.e., $V_d^*$ and $V_q^*$. As such, the sound injection voltages $V_{di}$ and $V_{qi}$ 121 are added to the corresponding initial output voltages $V_d^{}$ and $V_q^{}$ 161 of the current regulator 160 of the motor controller 50. The combination of the initial output voltages 161 and the sound injection voltages 121, i.e., $V_d^* = V_d^{**} + V_{di}$ and $V_q^* = V_q^{**} + V_{qi}$ are inverse-transformed back to the stationary reference frame voltage commands $V_\alpha^*$ and $V_\beta^*$ 126 in the inverse rotational transformation operation $T^{-1}(\theta)$ (dq-αβ) 165 using the position information from the position sensor 25. The stationary reference frame voltage commands $V_\alpha^*$ and $V_\beta^*$ 126 are decomposed into output voltage commands $V_a$, $V_b$ and $V_c$ 171 in the direct-quadrature conversion (αβ-abc) operation 170, and finally converted to the transistor control inputs $S_{ap} \sim S_{cn}$ 53, which are communicated via the control lines 52 to the power transistors 37 of the inverter power circuit 36 to cause the electric machine 20 to generate audible acoustic sound, wherein the audible acoustic sound can be sensed by a pedestrian when the electric machine 20 is employed on an electric vehicle application.

Figure 3:
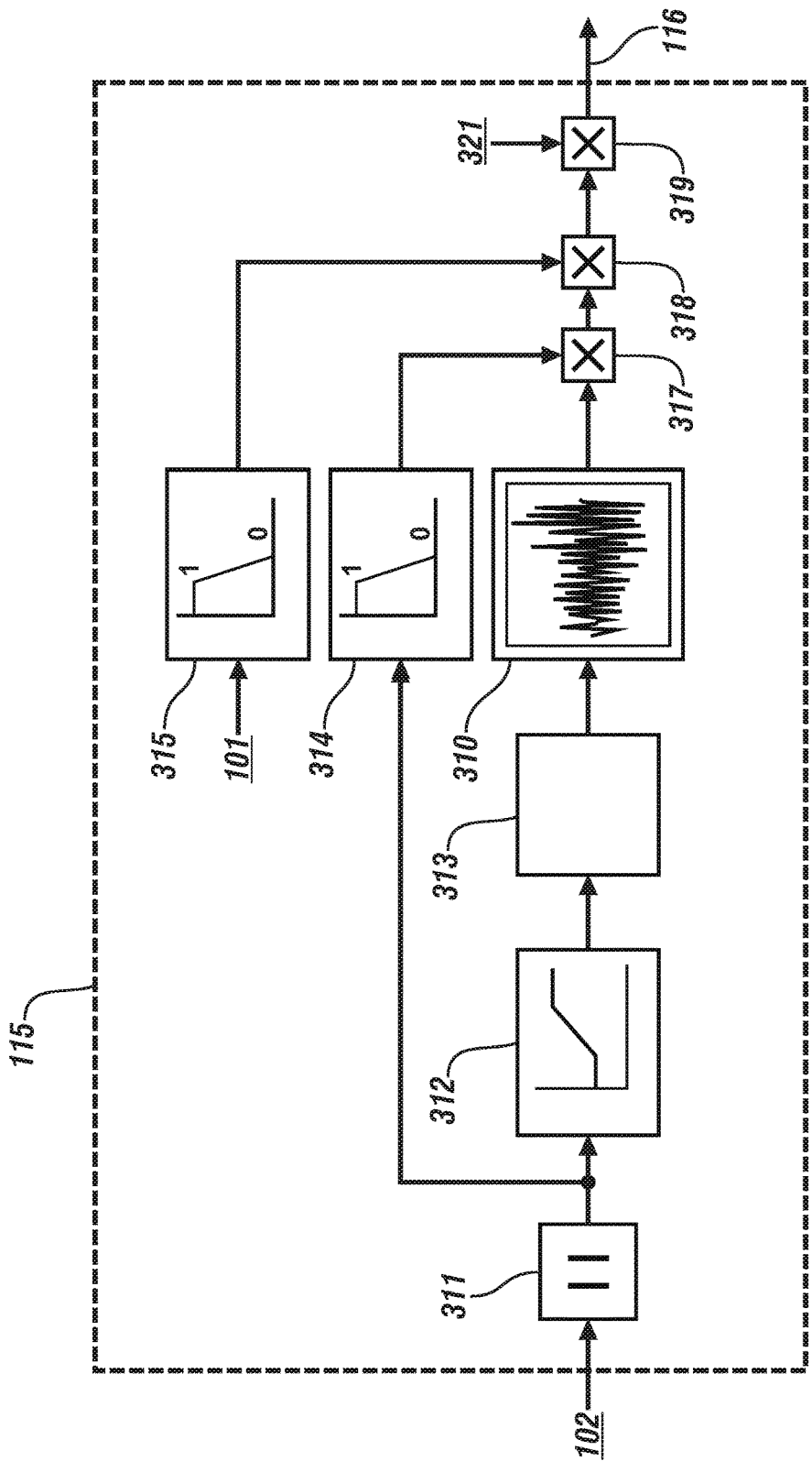
FIG. 3 schematically shows a block diagram illustrating a detailed implementation of the sound generator that is employed in the acoustic signal generator of FIG. 2, in accordance with the disclosure.

FIG. 3 schematically shows a block diagram depicting a detailed implementation of the sound pattern generator 115 that is employed in the acoustic signal generator 110 of FIG. 2, including a plurality of operators that interact to generate the instantaneous audio signal $V_i$ 116. The sound pattern generator 115 employs an arbitrary sound generator look-up table 310 to generate an arbitrary sound. By way of example, the look-up table can have N=10,000 elements. When the PWM frequency of the inverter power circuit 36 is 10 kHz, each element of the arbitrary sound generator look-up table 310 is read to play 1 second of sound, and its frequency component can theoretically range up to 5 kHz, which is half of the PWM frequency (equal to the sampling frequency) or Nyquist frequency. When the high frequency signal is generated, it will induce the high frequency current in the motor phase currents Ia, Ib and Ic 174 and the current regulator 160 will work to reject such high frequency current. However, the bandwidth of the current regulator 160 is generally fixed to the lower frequency range required by the torque control. Thus, when the frequency of the sound injection voltage is sufficiently higher than the bandwidth of the current regulator 160, this interaction is automatically minimized, and the initial output voltages $V_d^{}$ and $V_q^{}$ 161 output of the current regulator 160 do not interfere with the sound injection voltages $V_{di}$ and $V_{qi}$ 121. For example, if the current regulation bandwidth is 100 Hz, then about 100 Hz sound can be produced from this system without interfering with the sound and torque generation at the same time. Therefore, the arbitrary sound generator look-up table 310 preferably contains the frequency components higher than the current regulation bandwidth in order to avoid interaction with the torque control when it is played at the minimum pace, and less than the Nyquist frequency of the sampling system when it is played in the full speed, or at maximum pace.

Operator 311 takes an absolute number of the motor speed 102, which is sent to operator 312 to map the absolute input speed to some arbitrary speed to determine the playback speed $N_p$. An index i from index counter operator 313 is calculated as follows.

$$i[k] = i[k-1] + \Delta, \text{ where } 0 \le i[k] < N \quad [2]$$

$$\text{wherein } \Delta = \text{round}\left(\frac{N_p}{f_{sw}}\right), \text{ where } \Delta \ge 1, \text{ and } \Delta \text{ is an integer} \quad [3]$$

By changing $N_p$, the counter operator 313 can shift the frequency band of the output $V_i$ 116. For example, the sound sample can simulate the sound of an internal combustion engine, and changing $N_p$ can simulate the engine sound at different engine speeds.

Referring again to FIG. 2, the sound pressure level is related to the flux of the electromagnetic circuit, and the flux is related to the voltage applied to the winding of the electric machine 20. The output voltages $V_a^*$, $V_b^*$ and $V_c^*$ 171 are limited in the PWM inverter 36 by the bus voltage 103 from the battery or DC input source. The voltage required for the torque control, the initial output voltages $V_d^{}$ and $V_q^{}$ 161 are the sum of the voltage drop in the electric machine 20 in relation to the motor current and the back electromotive force (EMF), which is determined in relation to the motor current and speed. As a result, the difference between the available voltage by the PWM inverter and the required voltage for torque control becomes smaller as the motor speed and torque increases. The sound generator output in the form of the sound injection voltages $V_{di}$ and $V_{qi}$ 121 needs to decrease as the voltage difference decreases. In order to do this, operator 314 provides a gain factor associated with a speed-based gain derating and operator 315 provides a gain factor associated with a torque-based gain derating, which are multiplied with the output of the arbitrary sound generator look-up table 310 at corresponding multiplication operators 317 and 318 with additional input of a sound volume control 321 at multiplication operator 319.

The disclosure includes a control routine that adds a voltage signal to a motor output voltage to generate the acoustic signal from the electric machine while maintaining the primary function of the electric machine, i.e., torque and/or speed control. The acoustic signal can be used to notify an adjacent pedestrian of the location of the vehicle, or it can be used to mask the tonal sound from the motor rotation by increasing the ambient acoustic sound level. The concepts described herein facilitate the injection of a pattern of band-limited signals without disturbing operation of the electric machine to generate acoustic sound from the electric machine 20, employing voltage injection for acoustic sound generation. A frequency band-limited signal is contained in a look-up table, and at each sampling step, the voltage injection value is obtained from the look-up table, and the index for data look-up is incremented in relation to the operating speed. Furthermore, the voltage injection is limited by the available voltage for the motor control. In order to avoid the voltage shortage at high-load and high-speed operation, the amount of the voltage injection is limited by the speed and load/torque operating conditions. Furthermore, the concepts can be employed to mask tonal sound from the electric machine 20 to provide flexibility in motor design associated with sound generation.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The teachings may be described herein in terms of functional and/or logical operator components and/or various processing steps. Such operator components may be composed of hardware, software, and/or firmware components that have been configured to perform the specified functions. The flowchart and block diagrams in the flow diagrams illustrate the architecture, functionality, and operation of possible implementations of systems, methods, and computer program products according to various embodiments of the present disclosure. In this regard, each operator in the flowchart or operator diagrams may represent a module, segment, or portion of code, which includes one or more executable instructions for implementing the specified logical function(s). It will also be noted that each operator of the block diagrams and/or flowchart illustrations, and combinations of blocks in the block diagrams and/or flowchart illustrations, may be implemented by dedicated-operation hardware-based systems that perform the specified functions or acts, or combinations of dedicated-operation hardware and computer instructions. These computer program instructions may also be stored in a computer-readable medium that can direct a computer or another programmable data processing apparatus to function in a particular manner, such that the instructions stored in the computer-readable medium produce an article of manufacture including instruction means which implement the function/act specified in the flowchart and/or block diagram operator or operators.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A motor drive system for controlling operation of a multi-phase electric machine, comprising:
an inverter including a plurality of paired power transistors that are electrically connected to the electric machine, wherein the inverter is electrically connected to a DC power source via a high-voltage electrical power bus; and
a motor controller including a first controller and an acoustic signal generator, wherein the first controller is disposed to control the paired power transistors of the inverter to effect operation of the multi-phase electric machine;
wherein the first controller is disposed to determine an initial output voltage based upon a torque command;
wherein the acoustic signal generator is disposed to generate a sound injection voltage, including a sound pattern generator that is disposed to generate an instantaneous audio signal and a rotational transformation element that is disposed to generate the sound injection voltage based upon the instantaneous audio signal, and wherein the instantaneous audio signal is adjusted by a first gain factor associated with a torque-based gain derating and a second gain factor associated with a speed-based gain derating;
wherein the motor controller is disposed to combine the initial output voltage and the sound injection voltage; and
wherein the motor controller is disposed to generate commands to control the paired power transistors of the inverter, wherein the commands are determined based upon the initial output voltage and the sound injection voltage.

2. The motor drive system of claim 1, wherein the motor controller is disposed to generate the commands to control the paired power transistors of the inverter in response to the torque command and based upon the sound injection voltage.

3. The motor drive system of claim 1, wherein the motor controller is disposed to generate the commands to control the paired power transistors of the inverter in response to the torque command, a rotational speed of the electric machine, and a voltage level of the high-voltage electrical power bus and based upon the sound injection voltage.

4. The motor drive system of claim 1,
wherein the acoustic signal generator includes a sound pattern generator; and
wherein the acoustic signal generator is disposed to generate the sound injection voltage based upon an output from the sound pattern generator.

5. The motor drive system of claim 1,
wherein the first controller includes a current regulator disposed to generate current commands responsive to the torque command; and
wherein the acoustic signal generator includes a sound pattern generator that includes an arbitrary sound generator look-up table having frequency components that are greater than a maximum frequency associated with a bandwidth of the current regulator.

6. The motor drive system of claim 1:
wherein the first controller includes a first converter and a current regulator;
wherein the first controller is configured to generate current commands in response to a torque command;
wherein the current regulator is configured to generate initial output voltage commands based upon the current commands;
wherein the acoustic signal generator includes an acoustic sound pattern generator;
wherein the acoustic signal generator is disposed to generate the sound injection voltage based upon an output from the acoustic sound pattern generator; and
wherein the sound injection voltage is combined with the initial output voltage commands; and
wherein the sound injection voltage combined with the initial output voltage commands are communicated to the first controller to generate PWM commands to control the paired power transistors of the inverter.

7. The motor drive system of claim 4, wherein the sound pattern generator comprises an arbitrary sound generator look-up table including frequency components that are greater than a maximum frequency associated with a bandwidth of a current regulator that is associated with the first controller.

8. A method for controlling operation of an inverter that is electrically connected to a multi-phase electric machine, comprising:
determining, via a first controller, an initial output voltage based upon a torque command;
determining, via an acoustic signal generator, a sound injection voltage, including generating an instantaneous audio signal and a rotational transformation element that is disposed to generate the sound injection voltage based upon the instantaneous audio signal, wherein the instantaneous audio signal is adjusted by a first gain factor associated with a torque-based gain derating and a second gain factor associated with a speed-based gain derating;
combining the initial output voltage and the sound injection voltage; and
generating output voltage commands to control the inverter, wherein the output voltage commands are determined based upon the initial output voltage and the sound injection voltage.

9. The method of claim 8, comprising generating the commands to control the inverter in response to the torque command and based upon the sound injection voltage.

10. The method of claim 8, comprising generating the commands to control the inverter in response to the torque command, a rotational speed of the electric machine, and a voltage level of the high-voltage electrical power bus and based upon the sound injection voltage.

11. The method of claim 8, comprising:
generating current commands responsive to the torque command; and
determining the sound injection voltage with frequency components that are greater than a maximum frequency associated with a bandwidth that is associated with the current commands responsive to the torque command.

12. The method of claim 8, comprising:
generating the sound injection voltage based upon an output from the acoustic sound pattern generator; and
combining the sound injection voltage with the reference frame voltage commands; and
generating commands to control the paired power transistors of the inverter based upon the sound injection voltage combined with the reference frame voltage commands.

13. An acoustic signal generator for a motor controller that is disposed to control operation of a multi-phase electric machine, comprising:
a sound pattern generator configured to generate an instantaneous audio signal; and
a rotational transformation element configured to generate sound injection voltages based upon the instantaneous audio signal, wherein the instantaneous audio signal is adjusted by a first gain factor associated with a torque-based gain derating and a second gain factor associated with a speed-based gain derating,
wherein the sound injection voltages are input to the motor controller to control operation of the multi-phase electric machine.

14. The acoustic signal generator of claim 13, wherein the rotational transformation is disposed to locate the sound injection voltage into the motor controller of the electric machine.

15. The acoustic signal generator of claim 14, wherein the rotational transformation is expressed as:

$$\begin{bmatrix} V_{di} \\ V_{qi} \end{bmatrix} = \begin{bmatrix} \cos \gamma & -\sin \gamma \\ \sin \gamma & \cos \gamma \end{bmatrix} \begin{bmatrix} 0 \\ V_i \end{bmatrix} = \begin{bmatrix} -V_i \sin \gamma \\ V_i \cos \gamma \end{bmatrix}$$

wherein:
$\gamma$ represents a correct angular location to locate the sound injection voltage into the motor controller,
$V_{di}$ and $V_{qi}$ represent the sound injection voltages, and
$V_i$ represents voltage.

* * * * *